Oct. 21, 1924.  
R. R. ROBERTSON ET AL  
1,512,802  
PIPE  
Filed July 23, 1921

Inventors:  
Robert R. Robertson  
Carl G. Naylor  
By Foree Bain & Hinkle  
Attys.

Patented Oct. 21, 1924.

1,512,802

UNITED STATES PATENT OFFICE.

ROBERT R. ROBERTSON AND CARL G. NAYLOR, OF CHICAGO, ILLINOIS, ASSIGNORS TO NAYLOR-ROBERTSON COMPANY, A CORPORATION OF DELAWARE.

PIPE.

Application filed July 23, 1921. Serial No. 487,087.

*To all whom it may concern:*

Be it known that we, ROBERT R. ROBERTSON and CARL G. NAYLOR, citizens of the United States, all residing at Chicago, in the county of Cook and State of Illinois, have invented certain new and useful Improvements in Pipes, of which the following is a specification.

This invention relates to pipes.

It is particularly applicable to spirally wound lock-seam sheet metal substantially unyielding pipe.

Lock-seam spiral rigid pipe is ordinarily made from strips of relatively easily worked and consequently soft metals, such as sheet iron and mild steel. Ordinarily the metal must be easily worked in order that it will bend and not crack in the relatively abrupt curves of the interlocking spiral joint or seam.

An example of such pipe and a machine for making the same is set forth in Patent No. 1,288,134, December 17, 1918.

It has been found that pipe of this character may be excessively worn, especially at the joint or spiral seam, when the same is used to convey more or less abradant materials at relatively high velocities and under considerable pressure.

One of the objects of this invention is to provide an improved pipe.

Another object is to reenforce the pipe against excessive wear from the passage of material therethrough.

Another object is to provide a pipe with a wear resistant internal armor or lining.

Other objects and advantages will hereinafter appear.

An embodiment of the invention is illustrated in the accompanying drawing, wherein—

Figure 1:
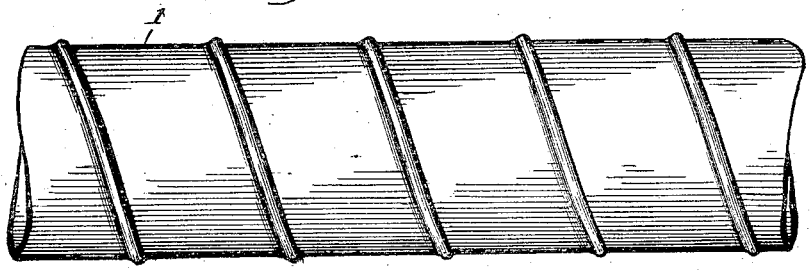
Fig. 1 is a perspective view of a spiral pipe as it appears from the outside.
Figure 2:
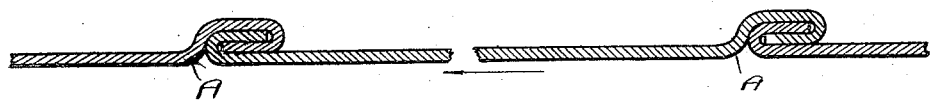
Fig. 2 is a cross-section through the joint or seam of an ordinary spiral pipe.

Spiral pipe comprises, in general, a tube formed from a spirally wound strip of metal. Heretofore the joint interconnecting the edges of adjacent convolutions or sections of the strip has been formed by folding the edges together to produce a suitable spiral lock-seam. Fig. 2 shows an example of such a seam in cross-section.

Particles of relatively hard materials conveyed through the pipe in the direction of the arrow impinge upon the spiraled surface A. This surface is more or less perpendicular to the path of and faces the stream through the pipe. When the material is driven at high velocity and under considerable pressure the particles strike this surface with great force and the resultant wear may be excessive. In fact the pipe, under some conditions, may be worn through and destroyed in a comparatively short time.

Figure 3:
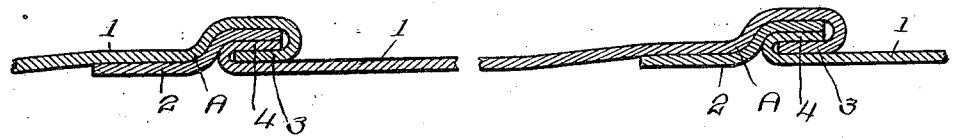
Fig. 3 is a cross-section through the armored seam of the improved pipe.

In the improved pipe the tube is primarily composed of a spirally wound strip 1 of the softer sheet metal as usual. The spiraled surface A and the inner wall of the pipe for some distance to the rear thereof are armored by a strip 2 of suitable wear resistant material, such as hard steel. The forward edge of this armoring or reenforcing strip is firmly clamped and held between the adjacent turned over and interlocking edges 3 and 4 of strip 1 which are folded together to form the spiraling lock-seam. It is not necessary, however, to bend the reenforcing strip at such an abrupt angle as the strip forming the tube, because the reenforcing strip does not have to serve to hold the joint together, the strip is not a holding member of the joint. The rear portion or heel of the relatively hard reenforcing strip and the tube may be pressed together between the mandrel and forming rolls with sufficient force to embed the same substantially flush into each other or the tube wall may be gradually tapered inwardly at the heel of the reenforcing strip, as shown in Fig. 3. The bore of the pipe consequently need not be reduced and special rolling mandrels are not required. Also the relatively soft tube has no abrupt shoulder in the path of the moving material.

The armoring wear resisting and reenforcing strip covers and protects that part of the tube which ordinarily is most exposed to the abrading action of the passing particles. It also assists in the production of a tight joint by acting as a packing. The gradually tapering wall of the tube at the heel of the reenforcing strip presents little or no obstruction to the passage of material. The material strikes the tube almost tangentially so that there is little wear thereon.

The reenforcing and armoring strip may be fed to a machine, such as set forth in the aforesaid patent, in the form of a ribbon. The seam forming rolls bend the ribbon into the required shape and clamp the same between the folds of the spiral lock-seam and against the inner wall of the tube as the seam is produced.

Figure 4:
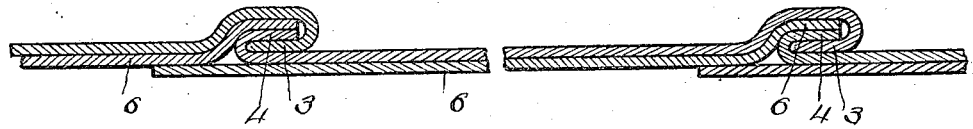
Fig. 4 shows a cross-section through the seam of a modified construction, wherein the entire inner wall of the pipe is armored.

Fig. 4 shows a cross-section of pipe, wherein the entire inner surface of the tube is lined or armored and reenforced. A strip of relatively hard wear resistant armoring material 6 has its forward edge rolled into and clamped between the adjacent spiral seam forming edges 3 and 4 of the main pipe, as before. The strips, however, are of such width that the rear edge overlies the seam of the adjacent anterior spiral convolution and bridges the joint made by the seam.

Instead of using an armor or lining of hard steel it may be found advisable, under some circumstances, to protect the joint and interior of the pipe by strips of other materials. Thus, for example, it may be found advisable, under some conditions to use strips of rubber, leather, fabric or other materials. The joint packing action of the armoring strip composed of some of these other materials may surpass that of the hard steel.

Having described our invention what we claim as new and desire to secure by Letters Patent, is:

1. A substantially rigid pipe composed of sections joined together, and a reenforcing wear resistant armoring strip on the inside of the pipe, more resistant to wear than the body of the pipe, and held in place by the joint between the sections.

2. A substantially rigid pipe composed of a spirally wound metal strip, the edges of adjacent convolutions being folded over each other to form a spiral joint, and a reenforcing armoring strip, more resistant to wear than the body of the pipe located on the inside of the pipe and having an edge thereof held between the edges forming the spiral joint.

3. A substantially rigid pipe comprising a spirally wound metal strip having the adjacent edges folded together to form a continuous spiral seam, and a reenforcing and armoring strip more resistant to abrasion than the body of the pipe wound in a spiral against the inside of the pipe and having one edge clamped and held in the folds of the spiral seam.

4. A substantially rigid internally armored pipe comprising a spirally wound metal strip the adjacent edges of which are folded together to provide an external continuous spiral seam, and a reenforcing strip of harder metal clamped between the folded edges forming the spiral seam and spirally wound to lie against the inside wall of the tube.

5. An internally armored pipe comprising a tube formed from a spirally wound metal strip the adjacent edges of which are folded together to provide an external continuous spiral seam, and a reenforcing strip of greater wear resistant material than the material of the strip clamped between the folded edges forming the seam and bridging an anterior convolution thereof.

6. A substantially rigid pipe composed of a spirally wound metal strip, the edges of adjacent convolutions being folded over each other to form a continuously spiral joint, and a strip of material, harder than the metal of the before mentioned strip, on the inside of the pipe, having its edge held between the edges of the spiral joint.

7. A substantially rigid pipe composed of a spirally wound metal strip, the edges of adjoining convolutions being folded over each other to form a joint and a third strip of harder material having its edge held between the edges of the spiral joint, said strips being relatively immovable.

In testimony whereof we hereunto set our hands.

ROBERT R. ROBERTSON.
CARL G. NAYLOR.